(12) United States Patent
Schleich et al.

(10) Patent No.: US 7,119,698 B2
(45) Date of Patent: Oct. 10, 2006

(54) CONSUMPTIVE LEAK DETECTION SYSTEM

(75) Inventors: Mike Schleich, Newman Lake, WA (US); Janet Penz, Lakeville, MN (US); Gregory Myers, Newman Lake, WA (US)

(73) Assignee: Itron, Inc., Spokane, WA (US)

( * ) Notice: Subject to any disclaimer, the term of this patent is extended or adjusted under 35 U.S.C. 154(b) by 195 days.

(21) Appl. No.: 10/965,283

(22) Filed: Oct. 14, 2004

(65) Prior Publication Data

US 2005/0190066 A1 Sep. 1, 2005

Related U.S. Application Data

(60) Provisional application No. 60/511,834, filed on Oct. 16, 2003.

(51) Int. Cl.
*G08B 21/00* (2006.01)

(52) U.S. Cl. ............... 340/605; 340/603; 340/870.02; 73/40

(58) Field of Classification Search ............... 340/605, 340/603, 606, 612, 616, 618, 870.01, 870.02; 70/40

See application file for complete search history.

(56) References Cited

U.S. PATENT DOCUMENTS

| 4,940,976 | A | * | 7/1990 | Gastouniotis et al. .. 340/870.02 |
| 5,155,481 | A | | 10/1992 | Brennan, Jr. et al. |
| 5,617,084 | A | | 4/1997 | Sears |
| 5,838,258 | A | * | 11/1998 | Saar ...................... 340/870.11 |
| 6,161,100 | A | * | 12/2000 | Saar .......................... 705/412 |
| 6,181,257 | B1 | | 1/2001 | Meek et al. |
| 6,377,190 | B1 | * | 4/2002 | Saar ...................... 340/870.02 |
| 7,039,529 | B1 | * | 5/2006 | Keech .......................... 702/45 |

\* cited by examiner

*Primary Examiner*—Toan N. Pham
(74) *Attorney, Agent, or Firm*—Peterson, Thuente, Skaar & Christensen, P.A.

(57) ABSTRACT

The leak detection system encompasses the use of a fluid monitoring device equipped with transmission capabilities and a data acquisition device. The fluid monitoring device monitors consumption of a fluid over a predetermined time period to obtain a consumption value. The fluid monitoring device then compares the consumption value against a pre-established threshold value. If the consumption value is less than the threshold value, the fluid monitoring device produces a leak indication. The fluid monitoring device transmits the leak indication, which is received by the data acquisition device.

21 Claims, 2 Drawing Sheets

CONSUMPTIVE LEAK DETECTION SYSTEM

The present application claims priority to U.S. Provisional Patent Application No. 60/511,834, filed Oct. 16, 2003, and entitled "Passive Consumptive Leak Detection." This provisional patent application is hereby incorporated by reference in its entirety.

FIELD OF THE INVENTION

The present invention is related to automatic meter reading (AMR) systems and, more particularly, to the detection of leaks within the metering system.

BACKGROUND OF THE INVENTION

To detect leakage beyond a metering point, utilities currently have to deploy an expensive data recorder to monitor intervals over a time period of interest. The data recorded is left in place, logging water consumption over a series of short intervals (on the order of 5 minutes). Post analysis of the data recorder looks for the minimum consumption level with the theory that at least one interval will register zero consumption if there are no leaks. If there are leaks, there will not be a zero level. In this model, the data recorder is too expensive to leave at the site and must be portable and moved to where a perceived leak may be.

Some AMR providers support leak detection, but in a brute force, non-efficient manner. These devices can be used to record the full interval data, but at added device, communications, and operations cost. Additional memory is needed to store essentially a month's worth of 5 minutes of data, communicating this amount of interval data is not possible by today's technology models for the industry— only a warning flag can be sent. Thus, there is an operations cost that is incurred in responding to the warning flag via a service call to manually collect the full interval data. This is troublesome, because the leak may be inconsequential or it may be a flood. In either case, the leak detection system will respond with the same level of priority.

In one approach, a utility company uses expensive (e.g., $2,500 FS Brainard) data recorders to detect water leakage in a seemingly unconventional, but effective manner. The data loggers are initially set to record hourly consumption. If a leak is suspected they are then programmed to record 10-second consumption. The theory is that there must be at least one interval where there is no water consumption: an interval that registers '0' units of water usage. If there is no such interval, the conclusion is that there is a water leak in the system. Using this approach helped the utility company to identify a 6 gallon/minute, $700 per month leak at a local hospital.

Other examples of leak detection systems are described in U.S. Pat. Nos. 5,155,481, 5,617,084 and 6,181,257, however they are not without their shortcomings. For instance, the '481 patent to Brennan, Jr. et al., discloses the use of a reed switch in combination with the magnetically coupled drive of the water meter. This approach is subject to failure over time since the state of the reed switch (or any other similar mechanical element) must be determined and such devices are subject to failure from fatigue. With respect to the '084 patent to Sears, only a yes/no indication of a leak is provided without an actual value of leakage level that would be of assistance to the user.

The trend of water becoming a less abundant resource, combined with the fact that utility companies are realizing that they are experiencing as much as 20% water leakage losses, highlights the need for finding a water leak detection system that is easy to implement and that requires a lower expenditure to implement.

SUMMARY OF THE INVENTION

The needs described above are in large part met by the leak detection system of the present invention. The leak detection system encompasses the use of a fluid monitoring device equipped with transmission capabilities and a data acquisition device. The fluid monitoring device monitors consumption of a fluid over a predetermined time period to obtain a consumption value. The fluid monitoring device then compares the consumption value against a pre-established threshold value. If the consumption value is less than the threshold value, the fluid monitoring device produces a leak indication. The fluid monitoring device transmits the leak indication, which is received by the data acquisition device.

In a preferred embodiment of the invention, the fluid monitoring device includes a utility meter that is equipped either for one-way or two-way communication. In this same embodiment, the data acquisition device is preferably a reader in an automatic meter reading system. The leak indication is provided in this transmission from the utility meter and preferably includes a leak/no leak indicator, a difference in consumption between the consumption value and the threshold, or both of the former leak indications. The predetermined time period is preferably established through use of a predetermined sample window time and a predetermined sample period time.

A method of the present invention includes the following steps: (1) monitoring the consumption of a fluid over a predetermined time period to obtain a consumption value; (2) comparing said consumption value to a threshold value; (3) producing a leak indication upon said consumption value being less than said threshold value; and (4) transmitting said leak indication.

BRIEF DESCRIPTION OF DRAWINGS

The invention may be more completely understood in consideration of the following detailed description of various embodiments of the invention in connection with the accompanying drawings, in which.

Figure 1:
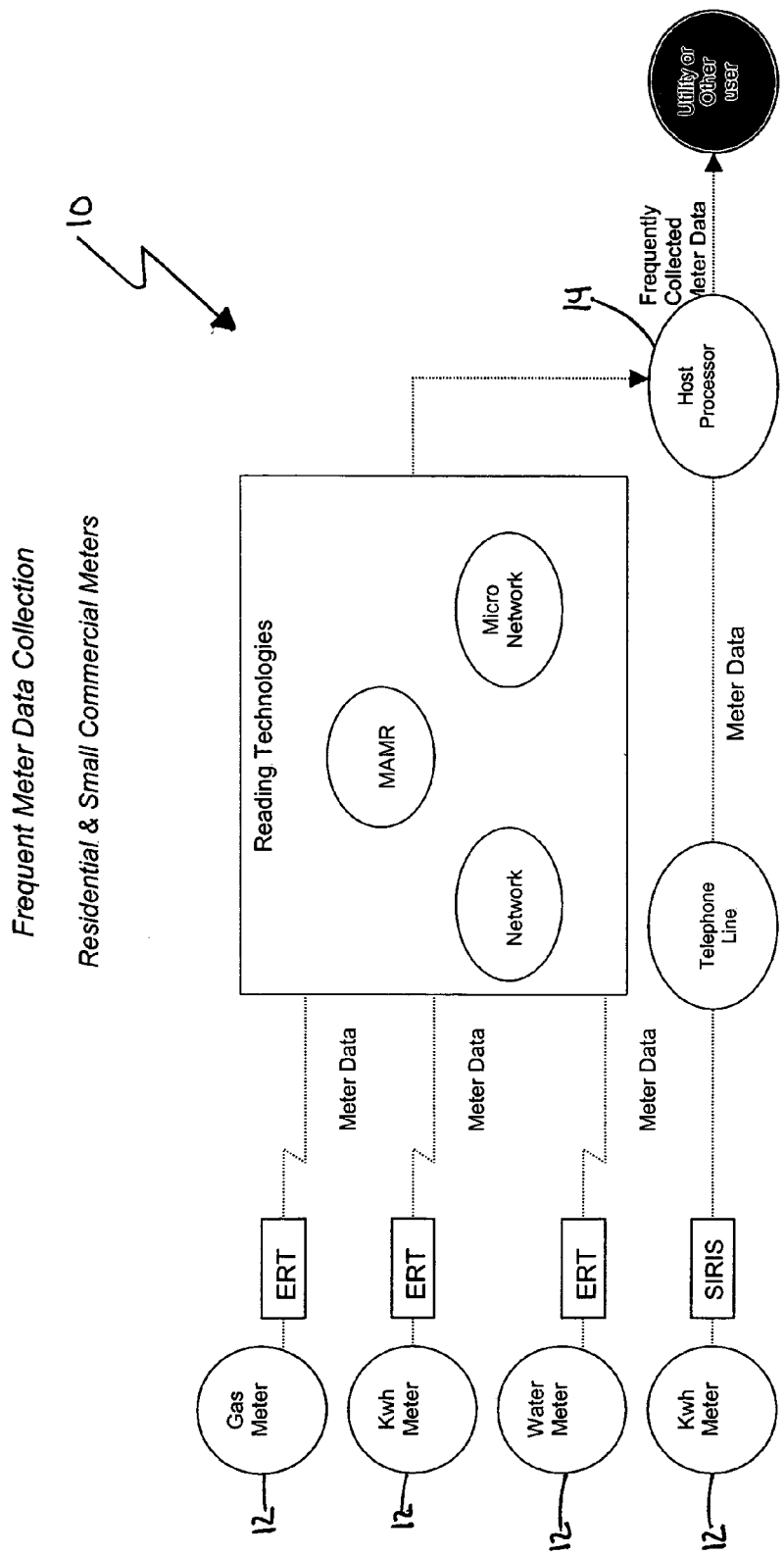
FIG. 1. depicts the layout of a typical automatic meter reading (AMR) system with meter endpoints, readers and host processors; the AMR system utilizes the leak detection system of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

The present invention is generally directed to a method and a system for detecting fluid leakage, e.g., water leaks, gas leaks, liquid propane, etc., in an automatic meter reading (AMR) system. A typical AMR system 10 is depicted in FIG. 1 and as shown typically includes a plurality of utility meters 12 that are equipped with devices, preferably the Itron ERT (encoder/receiver/transmitter), for transmitting and/or receiving utility consumption data. The utility consumption data ultimately reaches a host processor 14 wherein consumption data can be monitored and utilized as desired.

Figure 2:
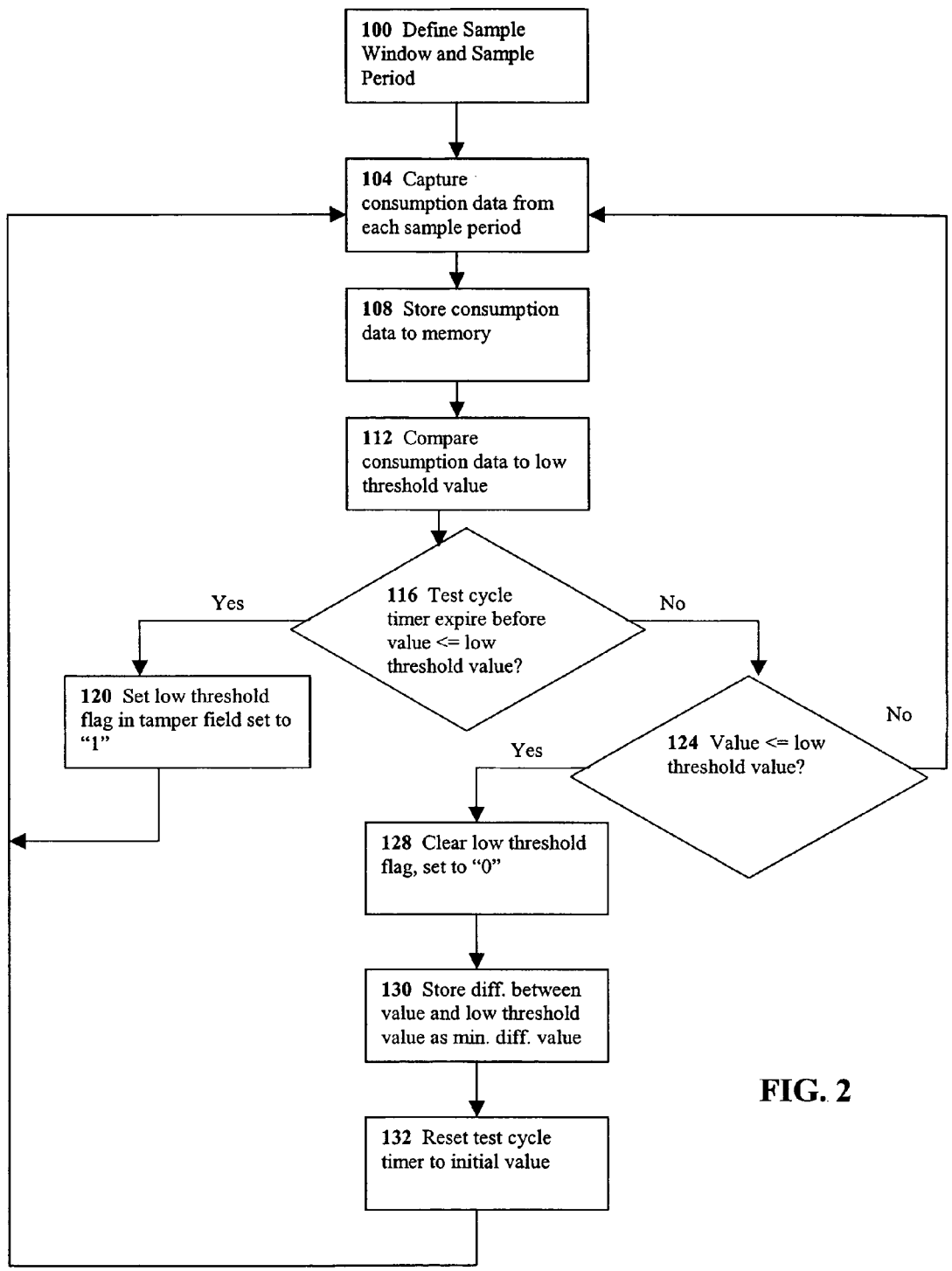
FIG. 2 provides a flow chart of the leak detection methodology of the present invention.

FIG. 2 provides a flowchart of the consumptive leak detection system that may be implemented in the firmware of an ERT. The parameters used within the leak detection system include: (1) a sample window—the period, in minutes, over which consumption is calculated (eight bit parameter 0 off, 1 to 255); (2) a sample period—the period of time, in hours, between sample windows (eight bit parameter 0 off, 1 to 255, it is recommended to use values that are not factors of 24 to keep from sampling at the same time every day); (3) a leak test cycle—the time in hours that may pass without a sample window value being lower than the low threshold value before the low threshold flag is set in the tamper field (12 bit parameter, 0 off, 1 to 1024); and (4) a low threshold value—the value that is compared to the consumption value taken in the sample window, the sample consumption must be below this value to set the low threshold flag (16 bit parameter, 0 to 65535, 0 is default).

The parameters that are returned from the endpoint ERT to a meter reader include: (1) a low threshold flag (either 0 or 1)—"0" indicates that a consumption interval difference less than or equal to the programmed low threshold value has been detected within the last leak test cycle, while "1" indicates that a consumption interval difference less than or equal to the programmed low threshold value has not been detected within the last leak test cycle; and (2) a minimum difference—the lowest consumption recorded within a sample window over the last leak test cycle. The minimum difference is preferably an eight bit parameter (0–255, wherein 255 is off, 254 is invalid read; 253 indicates a consumption value >=253, meaning it is too large for actual indication (overflow), and 0–252 indicate the actual minimum difference value).

It should be noted that in a one-way transmission AMR system, the low threshold flag is returned from the ERT via a high power pulse containing a tamper field that includes the low threshold flag bit and the minimum difference is also returned via a high power pulse containing the eight bit parameter. In a two-way transmission AMR system, the low threshold flag is returned from the ERT as a flag within the consumption value that is returned and the minimum difference is returned from the ERT in response to a command from a reader requesting the minimum difference.

The methodology implemented by the firmware within the endpoint ERT, and with reference to the flowchart of FIG. 2, is as follows. Per operations block 100, the sample window times and sample period times are defined. These parameters are preferably preset at the factory eliminating the need for programming at the installation site. Next, per operations block 104 and presuming that leak detection via the endpoint ERT has been enabled, consumption data is captured by the endpoint ERT during the sample window at every sample period. The captured consumption data is then stored to memory, per operations block 108. Each of the captured consumption data is compared to the low threshold value, per operations block 112. If the test cycle timer expires before a sample window value less than or equal to the low threshold value is captured, per decision block 116, the low threshold flag is set in the tamper field per operations block 120 and remains set until a value less than the low threshold is consumed.

However, if the test cycle timer does not expire before a sample window value less than or equal to the low threshold value is captured, per decision block 116, and a sample window value less than or equal to the low threshold value is actually found, per decision block 124, the low threshold flag is cleared, per operations block 128, the difference between the sample window value and the low threshold value is stored as the minimum value, per operations block 130, and the test cycle timer is reset to its initial value, per operations block 132. Control is then returned to operation block 104 where consumption data continues to be captured. If a sample window value less than or equal to the low threshold value is not actually found (and the timer has not yet expired), control of the program is returned to operations block 104 where the capture of consumption data continues.

Finally, when requested in a two-way transmission AMR system, or immediately preceding a transmission in a one-way transmission AMR system, the endpoint retrieves the minimum value. This minimum value is transported up from the endpoint in an eight bit binary representation (0–255, wherein 255 is off, 254 is invalid read; 253 indicates a consumption value >=253 meaning it is too large for actual indication (overflow), and 0–252 indicate the actual minimum difference value). Additionally, the endpoint provides a "no leak" indicator. When this function is enabled, the low threshold flag bit toggles in the tamper field indicating that a leak is (bit set to "0") or is not present (bit set to "1").

As mentioned above, the sample window time is preferably pre-established and programmed into the endpoint ERT. However, the sample window time may vary dependent upon the application. An example of how the sample window time may be calculated is provided below. Consider a utility water meter that has a counter resolution of 0.01 gallons and the user is interested in capturing all leakage flows on the order of a gallon a day:

```
Counter Resolution:              0.1 Gallon
Desired Leakage Rate to Capture: 10 Gallon/Day
10 Gallon/Day = 10 Gallon/1440 Minutes – 0.0069 Gallons/Minute
Number of Minutes for Window  = Counter Resolution/Leakage Rate
                              = 0.1 Gallon/0.0069 Gallons/Minute
                              = 14.49 minutes
```

Thus, when monitoring a water meter with a 0.01 Gallon resolution counter and desiring to capture a 1 Gallon/Day flow rate, the sample window time is configured to be about 15 minutes.

The present invention may be embodied in other specific forms without departing from the essential attributes thereof; therefore the illustrated embodiments should be considered in all respects as illustrative and not restrictive.

What is claimed is:

1. A system for detecting a leak of a monitored fluid, comprising:
   a fluid monitoring device, wherein said fluid monitoring device monitors consumption of the fluid over a predetermined time period to obtain a consumption value, compares the consumption value to a threshold value, and produces a leak indication upon said consumption value being less than said threshold value; and a data acquisition device, wherein said data acquisition device is in communication with said fluid monitoring device and receives said leak indication from said fluid monitoring device.

2. The system of claim 1, wherein said fluid monitoring device comprises a utility meter, wherein said utility meter is equipped to transmit utility meter data.

3. The system of claim 2, wherein said utility meter is equipped for one-way transmission of utility meter data.

4. The system of claim 2, wherein said utility meter is equipped for two-way transmission of utility meter data.

5. The system of claim 1, wherein said data acquisition device comprises a reader in an automatic meter reading system.

6. The system of claim 1, wherein said leak indication comprises: a leak/no leak indicator, a difference in consumption between said consumption value and said threshold value, or both a leak/no leak indicator and a difference in consumption between said consumption value and said threshold value.

7. The system of claim 1, wherein said predetermined time period is established by designation of a sample window time and a sample period time.

8. A method for detecting a leak in a monitored fluid, the method comprising:
monitoring the consumption of a fluid over a predetermined time period to obtain a consumption value;
comparing said consumption value to a threshold value;
producing a leak indication upon said consumption value being less than said threshold value; and
transmitting said leak indication.

9. The method of claim 8, wherein said step of monitoring is performed by a utility meter.

10. The method of claim 8, wherein said step of transmitting comprises one-way transmitting of said leak indication.

11. The method of claim 8, wherein said step of transmitting comprises two-way transmitting of said leak detection.

12. The method of claim 8, wherein said step of transmitting comprises transmitting to a reader in an automatic meter reading system.

13. The method of claim 8, wherein said leak indication comprises: a leak/no leak indicator, a difference in consumption between said consumption value and said threshold value, or both a leak/no leak indicator and a difference in consumption between said consumption value and said threshold value.

14. The method of claim 8, wherein said predetermined time period is established by designation of a sample window time and a sample period time.

15. A system for detecting a leak of a monitored fluid, comprising:
monitoring means for monitoring a fluid over a predetermined time period to obtain a consumption value, for comparing said consumption value to a threshold value, for producing a leak indication upon said consumption value being less than said threshold value, and for transmitting said leak indication; and
data means for communicating with said monitoring means and for receiving said leak indication from said monitoring means.

16. The system of claim 15, wherein said monitoring means comprises a utility meter.

17. The system of claim 15, wherein said monitoring means is equipped for one-way transmission of said leak indication.

18. The system of claim 15, wherein said monitoring means is equipped for two-way transmission of said leak indication.

19. The system of claim 15, wherein said data means comprises a reader in an automatic meter reading system.

20. The system of claim 15, wherein said leak indication comprises: a leak/no leak indicator, a difference in consumption between said consumption value and said threshold value, or both a leak/no leak indicator and a difference in consumption between said consumption value and said threshold value.

21. The system of claim 15, wherein said predetermined time period is established by designation of a sample window time and a sample period time.

* * * * *

UNITED STATES PATENT AND TRADEMARK OFFICE
CERTIFICATE OF CORRECTION

| | | |
|---|---|---|
| PATENT NO. | : 7,119,698 B2 | Page 1 of 1 |
| APPLICATION NO. | : 10/965283 | |
| DATED | : October 10, 2006 | |
| INVENTOR(S) | : Schleich et al. | |

It is certified that error appears in the above-identified patent and that said Letters Patent is hereby corrected as shown below:

Col. 4, line 58, "What is claimed is:" should be --What is claimed:--

Signed and Sealed this

Third Day of April, 2007

JON W. DUDAS
*Director of the United States Patent and Trademark Office*